Oct. 13, 1931.　　　V. P. WILLIAMS　　　1,827,129
FLEXIBLE COUPLING
Filed April 2, 1930
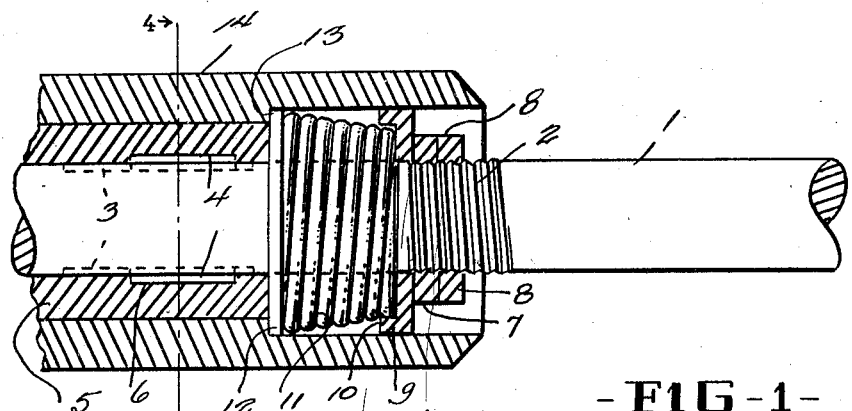
FIG-1
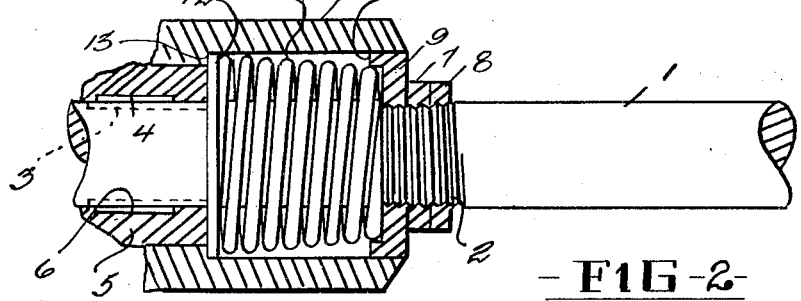
FIG-2
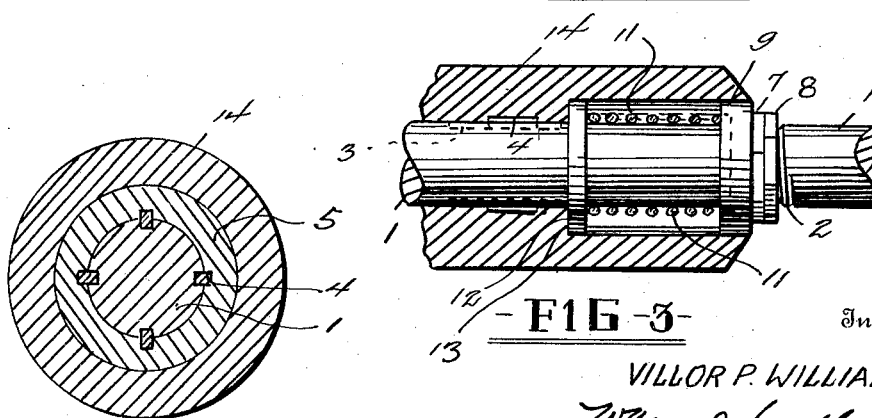
FIG-3
FIG-4
Inventor
VILLOR P. WILLIAMS,
By
Attorney Patented Oct. 13, 1931

1,827,129

UNITED STATES PATENT OFFICE

VILLOR P. WILLIAMS, OF BALTIMORE, MARYLAND, ASSIGNOR, BY MESNE ASSIGNMENTS, TO ESTELLE P. WILLIAMS, OF BALTIMORE, MARYLAND

FLEXIBLE COUPLING

Application filed April 2, 1930. Serial No. 441,144.

My present invention, in its broad aspect, has to do with improvements in means for permitting limited axial movement between sections of a shaft or the like, and more particularly it is an improvement in flexible couplings and relates to my co-pending application Serial #441,146, filed Apr. 2, 1930, now Patent 1,797,215, upon universal joints.

In the present instance I provide a unique union between the adjoining ends of the sections of a sectional shaft, or between the end of a drive shaft and a driven element, such for instance as the stub shaft of a universal joint, driven element, or the like, whereby limited axial play or movement is permitted without interfering with the operation of the shaft sections, inducing whipping, or otherwise interfering with the rotational movement of the shaft, or the like, as a whole.

Under certain circumstances it is desirable that there be a certain amount of axial flexibility where a shaft or other rotating element joins another element. In practice, the provision of such flexibility is not without difficulties, since certain devices of which I am familiar induce whipping, heating, and generally weaken the structure of the mechanism as a whole. My present coupling eliminates all of these disadvantages, and is simple in construction, effective, and needs no attention except perhaps an occasional drop of oil. Furthermore the coupling is easily assembled and taken apart; can be repaired with facility and its parts replaced without employing skilled labor or returning the parts to a factory, and the tension exerted between the coupled elements is adjustable without taking the coupling apart or materially interfering with the alignment of the shaft sections or the like. The essential pieces of my device are but five in number: namely (1) a spring (2) a lock nut assembly for adjusting purposes (3) a stop washer or fixed abutment element (4) a sleeve, and (5) a flanged washer. These parts may be applied to any sectional shaft on the job, and in a very short time, it being merely necessary to spline the end of the shaft and provide it with a few screw threads spaced from its end. In practice the detail construction of the parts of my device may undergo slight modification; for instance a spring having convolutions of uniform diameter may be substituted for a conical spring, or the like; and the right to make such changes is reserved provided they fall within the spirit of my invention as hereinafter described in detail.

In the drawings wherein is illustrated an embodiment of my invention:—

Figure 1 is a sectional side elevation of the coupling assembly compressed;

Figure 2 is a sectional side elevation of the coupling assembly extended;

Figure 3 is a sectional side view of a form of my coupling using a spring having convolutions of the same diameter, and Figure 4 is a section taken on the line 4—4 of Figure 1.

In the drawings wherein like characters of reference are used to designate like or similar parts throughout the several views:—

The shaft section (1) is provided with a series of screw threads (2) spaced from its end, and in advance of which (toward its end) are provided a series of grooves (3) for receiving splines (4) for attaching the shaft to a driven element (5) which has similar grooves (6) for receiving the splines (4). However the grooves of the shaft are so formed that there is considerable axial play; that is the shaft may be moved axially without interfering with its rotational movement, or its effective relationship to the driven element (5); the driven element (5) may be a hollow shaft, a cylindrical splice or coupling between shaft ends, or a shaft coupling to a driven piece of machinery or the like.

Fitted to move on the threads (2) is an adjusting and stop-nut (7) and a lock-nut (8) for determining the fixed position of nut (7) and in advance of nut (7) is a flanged washer (9), the flange (peripheral) (10) of which faces the end of the shaft to receive thereagainst one end of a coil spring (11). The spring (11) may be conical as shown in Figure 1, or as shown in Figure 3. That is, the particular form of the spring is immaterial provided it is of the compression type. The other end of the spring (11) abuts a stop-washer or the like (12) resting against a shoulder or rib (13) formed by increasing the thickness of the casing (14) at that point, so that the spring is confined between the flanged washer (9) and the stop-washer (12) and in assembling the parts, the space between the two washers may be partially filled with suitable grease or other lubricant. In practice it is also feasible to eliminate the washer (12) entirely thereby seating the end of the spring (11) directly against the rib (13).

The normal position of the shaft and parts is illustrated in Figure 2, but the shaft is capable of axial movement relative the driven element (5) against the pressure exerted by the spring (11); the extent of movement and of the pressure exerted by the spring being determined by the position of adjusting and stop-nut (7). The washer—that is the periphery of the washer (12) rides against the wall of the casing (14). In fitting a shaft with my coupling, it is merely necessary to groove it to receive the splines and thread it to receive the nuts (7) and (8). In Figure 3, for instance, the type of driven element (5) shown in Figures 1 and 2, is omitted, and a spring having convolutions of uniform diameter (11) is used in place of a slightly conical spring as shown in Figures 1 and 2.

It is believed that the operation of my present invention is apparent from the foregoing, but emphasis is again directed toward the simplicity, practicability, and the fact that my coupling may be applied on the job to conventional forms of power transmission elements. Therefore while the combination and arrangement of parts heretofore described constitutes the preferred embodiment of my invention, it is desired to again point out that the scope of the invention should only be determined by the claims appended hereunto.

I claim:—

1. A coupling between driving and driven elements comprising a flexible connection between the elements for permitting some axial play therebetween, a pair of stop members on one element, a spring confined between the stop members, and a casing about the stop members and spring and provided with means for fixing the position of one stop member, and means carried by the said element for adjusting and limiting the movement of the other stop member, whereby the play of the latter element with respect to the first mentioned element is against the tension of the spring and limited thereby.

2. A coupling between driving and driven elements comprising a connection between the two elements permitting limited independant axial movement of one element with respect to the other, a pair of spaced stop members on one element and slidably mounted thereon, a spring confined between the two stop members, a casing about the stop members and spring and provided with a shoulder for fixing the position of one stop member, and adjustable means carried by said element for fixing the position of the other stop member, whereby the play of the latter element with respect to the other is against the spring and limited thereby.

3. A coupling between driving and driven elements comprising a connection for joining said elements for rotational movement but formed to permit limited independent axial movement therebetween, a spring about one of said elements, a casing having a rib for limiting the movement of the spring in one direction, and adjustable means on said latter element bearing against the other end of the spring whereby the axial play of the latter element with respect to the other is against the spring and limited thereby said adjustable means formed with a continuous edge flange within which the end of the spring is seated.

4. A flexible union for power transmission elements comprising a member for joining said elements for rotational movement but formed to permit limited independant axial movement between the elements a casing formed with a rib, a spring on one element, a stop washer engaging the rib for limiting the movement of the spring in one direction, and other means adjustably mounted on said latter element for confining the other end of the spring and placing the spring under tension to resist the axial movement of said latter element.

5. A flexible union for power transmission elements comprising a member for joining said elements for rotational movement and formed to permit independent axial movement of one of said elements, a spring on said latter element, a casing about the spring limiting its movement in one direction, and said latter element carrying adjustable means for limiting the movement of the spring in another direction and confining the same to direct its force against the axial movement of said element.

6. A coupling for shaft sections comprising a union permitting limited axial movement of one secton with respect to the other, a casing, a spring in the casing, said casing formed with a shoulder to limit the movement of the spring, an adjustable nut on the movable shaft section, and the nut bearing against the end of the spring to normally urge said section away from the fixed section.

In testimony whereof, I affix my signature hereunto.

VILLOR P. WILLIAMS.